United States Patent
Moon et al.

(10) Patent No.: US 9,808,751 B2
(45) Date of Patent: Nov. 7, 2017

(54) COMPLEX FILTER AND WATER PURIFIER INCLUDING COMPLEX FILTER

(75) Inventors: Kyunghee Moon, Seoul (KR); Changho Lee, Seoul (KR); Hyunhwan Oh, Seoul (KR); Sangduck Lee, Seoul (KR); Jeayoul Joung, Seoul (KR); Jeongil Kye, Seoul (KR); Min-Joung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 493 days.

(21) Appl. No.: 13/521,528

(22) PCT Filed: Nov. 8, 2010

(86) PCT No.: PCT/KR2010/007848
§ 371 (c)(1),
(2), (4) Date: Jul. 11, 2012

(87) PCT Pub. No.: WO2011/090261
PCT Pub. Date: Jul. 28, 2011

(65) Prior Publication Data
US 2012/0292247 A1    Nov. 22, 2012

(30) Foreign Application Priority Data

Jan. 19, 2010  (KR) .................. 10-2020-0004702
Feb. 3, 2010   (KR) .................. 10-2010-0009816
Apr. 26, 2010  (KR) .................. 10-2010-0038431

(51) Int. Cl.
*B01D 39/20*    (2006.01)
*B01D 63/02*    (2006.01)
(Continued)

(52) U.S. Cl.
CPC ....... *B01D 39/2055* (2013.01); *B01D 63/024* (2013.01); *B01D 67/0093* (2013.01);
(Continued)

(58) Field of Classification Search
None
See application file for complete search history.

(56) References Cited

U.S. PATENT DOCUMENTS 4,808,202 A  *  2/1989  Nishikawa et al. .......... 181/175
5,149,437 A      9/1992  Wilkinson et al.
(Continued)

FOREIGN PATENT DOCUMENTS

CN      2192612 Y    3/1995
CN   101559301 A    10/2009
(Continued)

OTHER PUBLICATIONS

European Search Report for Application No. 10844057.9, dated Jul. 22, 2013.
(Continued)

*Primary Examiner* — Benjamin Kurtz
(74) *Attorney, Agent, or Firm* — KED & Associates, LLP

(57) ABSTRACT

The present invention relates to a complex filter and to a water purifier including a complex filter. By providing a complex filter for a water purifier including an antibacterial hollow fiber membrane, activated carbon fibers, ion-exchange fibers, and one or more activated carbon layers arranged in an optimized combination, the size of a water purifier can be reduced, and excellent water-purifying performance and an improved service life can be provided.

7 Claims, 13 Drawing Sheets

(51) Int. Cl.
*B01D 69/08* (2006.01)
*C02F 1/00* (2006.01)
*C02F 1/42* (2006.01)
*C02F 1/28* (2006.01)
*C02F 1/44* (2006.01)
*B01D 67/00* (2006.01)

(52) U.S. Cl.
CPC .............. *B01D 69/08* (2013.01); *C02F 1/003* (2013.01); *B01D 2239/0414* (2013.01); *B01D 2239/065* (2013.01); *B01D 2325/48* (2013.01); *C02F 1/283* (2013.01); *C02F 1/42* (2013.01); *C02F 1/444* (2013.01); *C02F 2201/006* (2013.01)

(56) References Cited

U.S. PATENT DOCUMENTS

| | | | |
|---|---|---|---|
| 2002/0117436 A1* | 8/2002 | Rajan | C02F 1/003 210/266 |
| 2003/0164333 A1* | 9/2003 | Nohren, Jr. | A45D 33/008 210/650 |
| 2006/0225574 A1 | 10/2006 | Braeunling et al. | |
| 2007/0235381 A1* | 10/2007 | Tsai | 210/287 |
| 2010/0065503 A1* | 3/2010 | Olson et al. | 210/694 |

FOREIGN PATENT DOCUMENTS

| | | |
|---|---|---|
| EP | 0445792 | 9/1991 |
| JP | 08-131728 | 5/1996 |
| JP | 2006-061747 | 3/2006 |
| JP | 2009-226380 | 10/2009 |
| KR | 20-1989-0008717 | 11/1989 |
| KR | 10-1998-0040299 | 8/1998 |
| KR | 10-0356437 | 10/2002 |
| KR | 10-2006-0108229 A | 10/2006 |
| KR | 20-2009-0012184 | 12/2009 |
| WO | WO 2007/003383 | 1/2007 |

OTHER PUBLICATIONS

Chinese Office Action dated Nov. 27, 2013 for corresponding Application No. 201080061870.
Yilu et al, "Preparation of Antimicrobial Biaxially Oriented Poly(terafluoroethylene) Film", China Academic Journal Electronic Publishing House, New Chemical Materials, vol. 34, No. 12 (2006).
International Search Report issued in PCT Application No. PCT/KR2010/007848 dated Aug. 1, 2011.
Korean Office Action for Application 10-2010-004702 dated Nov. 11, 2015.
European Notice of Allowance dated Jul. 6, 2017 issued in Application No. 10844057.9.

* cited by examiner

DIRECTION OF TARGET WATER

COMPLEX FILTER AND WATER PURIFIER INCLUDING COMPLEX FILTER

CROSS-REFERENCE TO RELATED PATENT APPLICATIONS

This application is a U.S. National Stage Application under 35 U.S.C. §371 of PCT Application No. PCT/KR2010/007848, filed Nov. 8, 2010, which claims priority to Korean Patent Application 10-2010-0004702, filed Jan. 19, 2010, Korean Patent Application 10-2010-0009816, filed Feb. 3, 2010, and Korean Patent Application 10-2010-0038431, filed Apr. 26, 2010.

TECHNICAL FIELD

The present invention relates to a complex filter for a water purifier and a water purifier including the complex filter, and more specifically to a complex filter including at least of activated carbon, activated carbon fibers, ion-exchange fibers, and an antibacterial hollow fiber membrane, and a water purifier including the complex filter.

BACKGROUND ART

Recently, the quality of tab water is sharply deteriorated thus causing problems. For example, organic materials, such as phenol, or unwanted materials including rust, soil, or alkali earth metals, which are contained in the water, negatively affect human health and worsen taste of the water. Moreover, increasing communal living force many people to share a water tank in which water may be easily contaminated due to poor management and inflow of contaminants. Thus, there is an increasing demand for water purifiers.

In general, water purifiers filter water required to be purified (target water), such as tab water or natural water, and provide purified warm or cold water. A water purifier requires multiple filters that rid components harmful to human bodies, including floating matter, or malodor from the target water and kill germs that cause waterborne diseases.

A water purifier selectively includes precipitation filters through which target water sequentially passes to purify the target water, a granular activated carbon filter that includes activated carbon with fine pores to perform adsorption for filtering, a hollow fiber membrane filter that includes multiple fine pores distributed on a membrane surface to remove contaminants, and a UV (Ultra Violet) sterilization filter.

A need exists for research and development on water purifiers with increased lifespan and a reduced size.

DISCLOSURE

Technical Problem

An object of the present invention is to provide a complex filter which allows a water purifier to be reduced in size and to provide better capacity of water purification and a water purifier including the complex filter.

Another object of the present invention is to provide a complex filter that removes both harmful materials and byproducts of sterilization from target water and a water purifier including the complex filter.

Still another object of the present invention is to provide a complex filter that can rid pathogenic microorganism in a water purifier and a water purifier including the complex filter.

Technical Solution

A complex filter for water purification according to a first aspect of the present invention includes a housing, an inlet formed at a side of the housing, wherein water to be purified is introduced through the inlet, an outlet formed at another side of the housing, wherein the water to be purified is purified and then discharged through the outlet, and a complex filter module formed between the inlet and the outlet, the complex filter module including an activated carbon fiber layer and an ion exchange layer, wherein the activated carbon fiber layer and the ion exchange layer are alternately stacked along a side wall of the housing.

A complex filter for a water purifier according to a second aspect of the present invention includes an antibacterial hollow fiber membrane, wherein the antibacterial hollow fiber membrane is manufactured by forming a hollow fiber membrane by distributing a polymer solution containing polymer to a nonsolvent, soaking the formed hollow fiber membrane into a silver ion solution so that silver ions are impregnated into the hollow fiber membrane, and reducing the silver ions by soaking the silver ion-impregnated hollow fiber membrane into a reaction solution containing at least one of hydrazine and anhydrous hydrazine hydrate.

Advantageous Effects

According to the present invention, there are provided a complex filter including a plurality of activated filtering units, which allows a water purifier to decrease in size and to provide further improved capacity of purification and a water purifier including the complex filter.

According to the present invention, there are provided a complex filter including activated carbon fibers and ion-exchange fibers, which allows for a simplified structure and excellent water-purifying performance, and a water purifier including the complex filter.

According to the present invention, there are provided a complex filter including a hollow fiber membrane whose surface is applied with silver particles to remove pathogenic microorganisms and a water purifier including the complex filter.

BEST MODE

Figure 1:
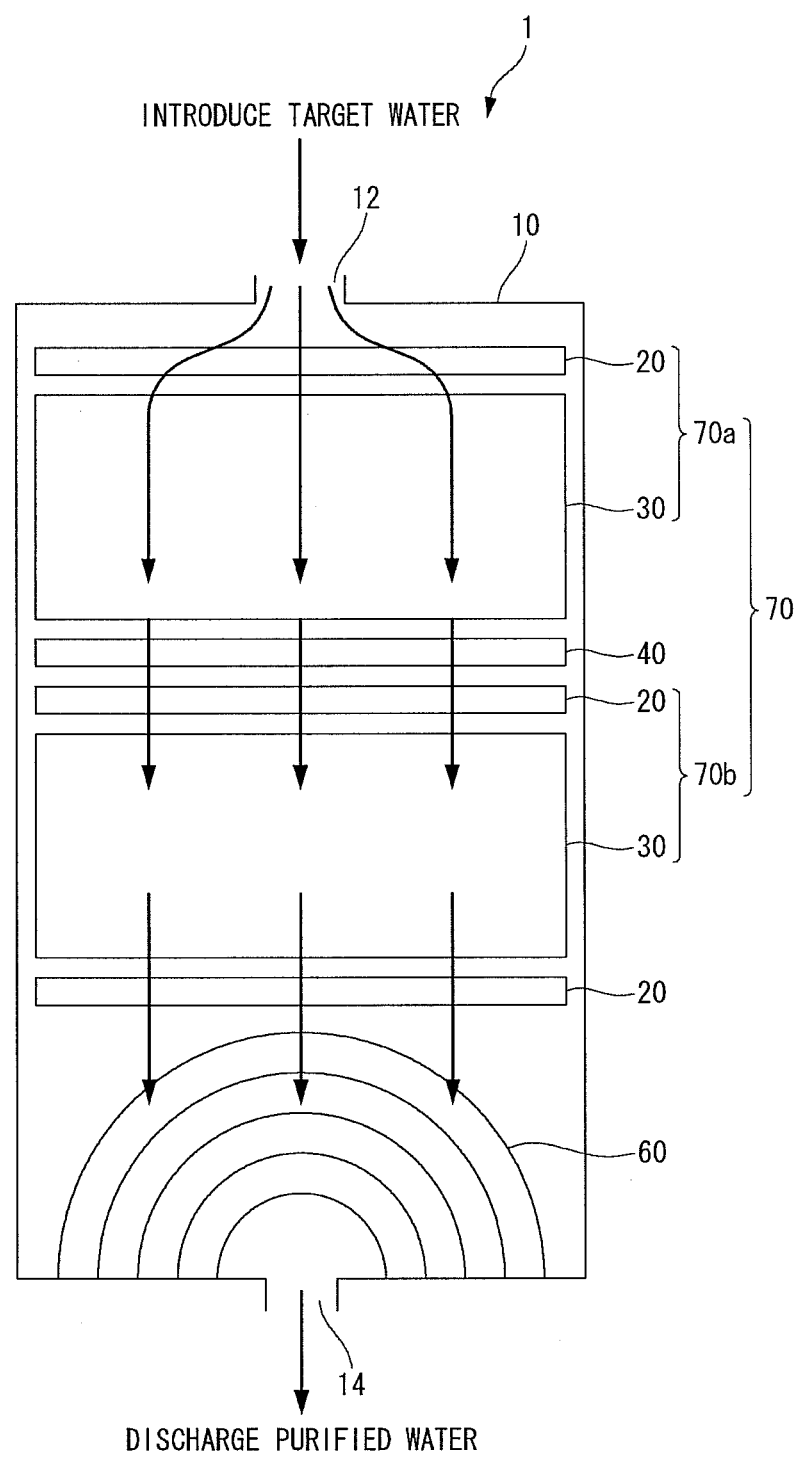
FIG. 1 illustrates a complex filter for water purification according to an embodiment of the present invention.

The above-described objects, features, and advantages of the present invention will be more apparent from the detailed description taken in conjunction with the accompanying drawings. Preferred embodiments of the present invention will be described in greater detail with reference to the accompanying drawings. The same reference numerals refer to the same components throughout the specification. The specific description on known functions or configurations associated with the present invention, which is determined to make the gist of the invention unnecessarily unclear, will be omitted.

FIG. 1 illustrates a complex filter for water purification according to an embodiment of the present invention.

Referring to FIG. 1, the complex filter 1 for water purification according to an embodiment of the present invention includes a housing 10, an inlet 12, an outlet 14, an activated carbon fiber 20, an activated carbon layer 30, and a hollow fiber membrane 60. These components are not necessary and thus more or less components may be included in the complex filter 1 for water purification. As used herein, the complex filter 1 for water purification collectively refers to a filter that is used to purify raw water and may apply to, e.g., a water purifier.

For convenience of description, the activated carbon fiber 20 and the activated carbon layer 30 are hereinafter referred to as an activated carbon filtering unit 70. The complex filter 1 for water purification may include one or more activated carbon filtering units 70a and 70b. The one or more activated carbon filtering units 70a and 70b may be divided into an upper activated carbon filtering unit 70a and a lower activated carbon filtering unit 70b depending on a relative position.

In general, the complex filter 1 for water purification may refer to a filtering device that is used to purify water. The complex filter according to the present invention is small in volume and may provide a function of effectively removing harmful components contained in the water. Hereinafter, the filter refers to the complex filter 1. The complex filter 1 for water purification according to the present invention will be described in greater detail.

The housing 10 may form an outer structure of the complex filter 1 for water purification. That is, the housing 10 may prepare for a space where the activated carbon filtering units are positioned.

A cross section of the housing 10 may have a shape that corresponds to cross sections of the activated carbon fiber 20, the activated carbon layer 30, and the hollow fiber membrane 60.

Further, the housing 10 may include an inlet 12 and an outlet 14. Water to be purified ("target water") flows into the inlet 12. Here, the target water may refer to general unpurified tab water or so. Raw water is included in the target water.

Purified water is discharged through the outlet 14. That is, the target water is introduced through the inlet 12, purified, and then discharged through the outlet 14.

The activated carbon filtering unit 70 may provide a function of purifying raw water using activated carbon. For example, the activated carbon filtering unit 70 may remove residual chlorine among various components contained in the raw water. Further, the activated carbon filtering unit 70 may have a function of adsorbing and removing a material that causes malodor.

As described above, the activated carbon filtering unit 70 may include at least one of the activated carbon fiber 20 and the activated carbon layer 30.

The activated carbon contained in the activated carbon filtering unit 70 may have a carboxy group. The carboxy group may provide a function of adsorbing heavy metals or metals. The carboxy group may be generated by reaction with oxygen when alcohol group of cellulose which is plant fiber combusts. Also, the activated carbon filtering unit 70 may include one or more adsorbents to enhance water-purifying performance.

The activated carbon filtering unit 70 is hereinafter described in greater detail. For convenience of description, the activated carbon fiber 20 of the activated carbon filtering unit 70 is described, and the activated carbon layer 30 is then described.

The activated carbon fiber 20 of the activated carbon filtering unit 70 is also referred to as activated carbon fiber and is an adsorbent that may sharply enhance adsorption capacity and speed existing granular activated carbon. The activated carbon fiber 20 includes innumerable micro pores that are involved in adsorption, and thus provides large adsorption capacity. The activated carbon fiber 20 provides large adsorption speed because the micropors are developed on the surface. In particular, volatile organic compounds (VOC), such as free residual chlorine, triholomethanes, or chloroform, and lead may be effectively adsorbed. Besides, the activated carbon fiber 20 is capable of removing amine odor and methyl mercaptan.

Further, the activated carbon fiber 20 is in the form of fiber and may be easily processed. For example, a needle-punch process may be used to process the activated carbon fiber 20. The needle-punch process may refer to a process that produces felt thread into webs, punches the webs with a needle, and then attaches the punched webs to each other.

That is, the activated carbon fiber which is in the form of felt is subjected to cutting or punching by the needle-punch process, thereby resulting in a user's desired form. The felt may refer to thick and smooth cloth that is fabricated by compressing woolen fabric or hairs.

In summary, the activated carbon fiber 20 is material that may be easily treated and has excellent capacity in removing harmful substances contained in the water.

The activated carbon fiber 20 may have a shape corresponding to the housing 10. That is, when the housing 10 is in the shape of a circle, the activated carbon fiber 20 may have a circular shape as well.

The target water introduced through the inlet 12 may be first purified by the activated carbon fiber 20. That is, the activated carbon fiber 20 may remove free residual chlorine, triholomethanes, or chloroform, and lead from the target water by adsorption as described above.

The activated carbon fiber 20 has a high adsorption speed and thus has a high volume of water purification, which enables the filter to be made smaller. That is, the amount of existing activated carbon may be reduced. Thus, since the space for installing a filter in the water purifier is reduced, the water purifier may be reduced in size and weight.

Further, the activated carbon fiber 20 may provide a function of a distributing plate. Since the diameter of the housing 10 is larger than the diameter of the inlet 12, the introduced target water needs to be widely spread. Since the activated carbon fiber 20 is made of fiber material, the activated carbon fiber 20 may function as a distributing plate that widely distributes the introduced target water.

Still further, the activated carbon fiber 20, which is highly hydrophilic and is quickly adsorbed with harmful substances, may prevent the introduced target water from being stuck at the inlet 12. That is, water clogging is less likely to take place, thus reducing pressure losses.

In other words, the inlet 12 and the activated carbon fiber 20 are arranged so that the target water introduced into the inlet 12 first passes through the activated carbon fiber 20, which allows the target water to be evenly distributed, thus resulting in no need for a separate distributing plate and a reduced frequency of occurrence of water clogging.

The activated carbon fiber 20 may be made of felt or block molding.

Figure 2:
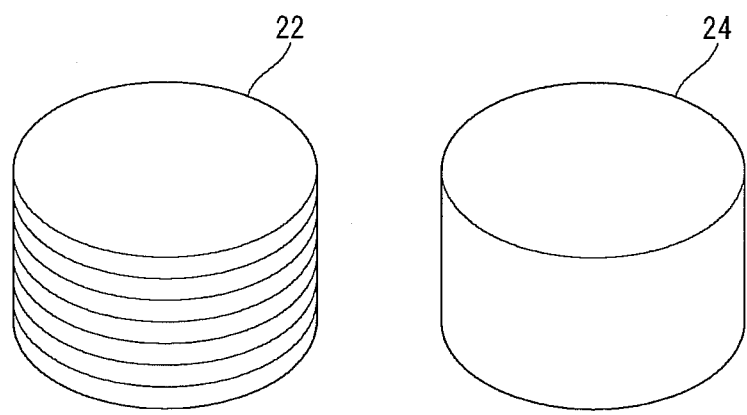
FIG. 2 illustrates activated carbon fabric according to an embodiment of the present invention.

Referring to FIG. 2, the felt-type activated carbon fabric 22 may be stacked in a multilayered structure.

FIG. 2 illustrates activated carbon fabric according to an embodiment of the present invention.

For example, the felt-type activated carbon fabric 22 may have a predetermined thickness. Such felt-type activated carbon fabric 22 may have about seven or eight stacks. As described above, the felt-type activated carbon fabric 22 may be easily processed by a needle punch process.

Or, a block molding-type activated carbon fabric 24 may be used.

The activated carbon fiber 20 has been specifically described so far. Hereinafter, the activated carbon layer 30 will be described in detail. The activated carbon layer 30 may provide functions of purifying water and enhancing the taste of the water. More specific functions will be described below.

The activated carbon layer 30 may be coconut based, lignocellulosic, or coal based activated carbon according to the raw substance thereof.

The coconut based activated carbon layer may contain coconut shell as its raw material. The coconut based activated carbon layer has characteristics, such as a large inner surface area and a small diameter. Further, the coconut based activated carbon shows a low ash content and high purity and thus may be appropriate for purification of drinks and/or food. The coconut based activated carbon may be produced in the form of powder and/or granules. That is, the activated carbon layer 30 may be formed of powder and/or granules by using coconut-based material.

The lignocellulosic activated carbon layer may be made of wood or sawdust. The lignocellulosic activated carbon layer also exhibits a large inner surface area, a small pore diameter, a low ash content, and high purity and may be thus appropriate for purification of drinks and/or food. The lignocellulosic activated carbon layer may be produced in the form of powder and/or granules.

The coal based activated carbon layer may have coal as its raw material. The coal based activated carbon layer may have characteristics, such as a small inner surface area and a relatively large pore diameter. Further, the coal based activated carbon layer is economical and shows characteristics, such as high mechanical intensity and excellent wear resistance compared to other raw materials. The coal based activated carbon layer may be produced in the form of granules.

Further, the activated carbon layer 30 may be divided into granular activated carbon and powdered activated carbon.

The granular activated carbon may have attributes, such as a pore volume of 0.5 to 1.0 cm$^3$/g, a specific surface area of 700 to 1500 m$^2$/g, and an average pore diameter of 12 to 30 Å.

The powdered activated carbon may have attributes, such as a pore volume of 0.4 to 0.5 cm$^3$/g, a specific surface area of 700 to 1500 m$^2$/g, and an average pore diameter of 15 to 30 Å.

The granular activated carbon may be manufactured by the methods described in connection with FIGS. 3 and 4, and the powdered activated carbon may be manufactured by the methods described in connection with FIGS. 5 and 6.

Figure 3:
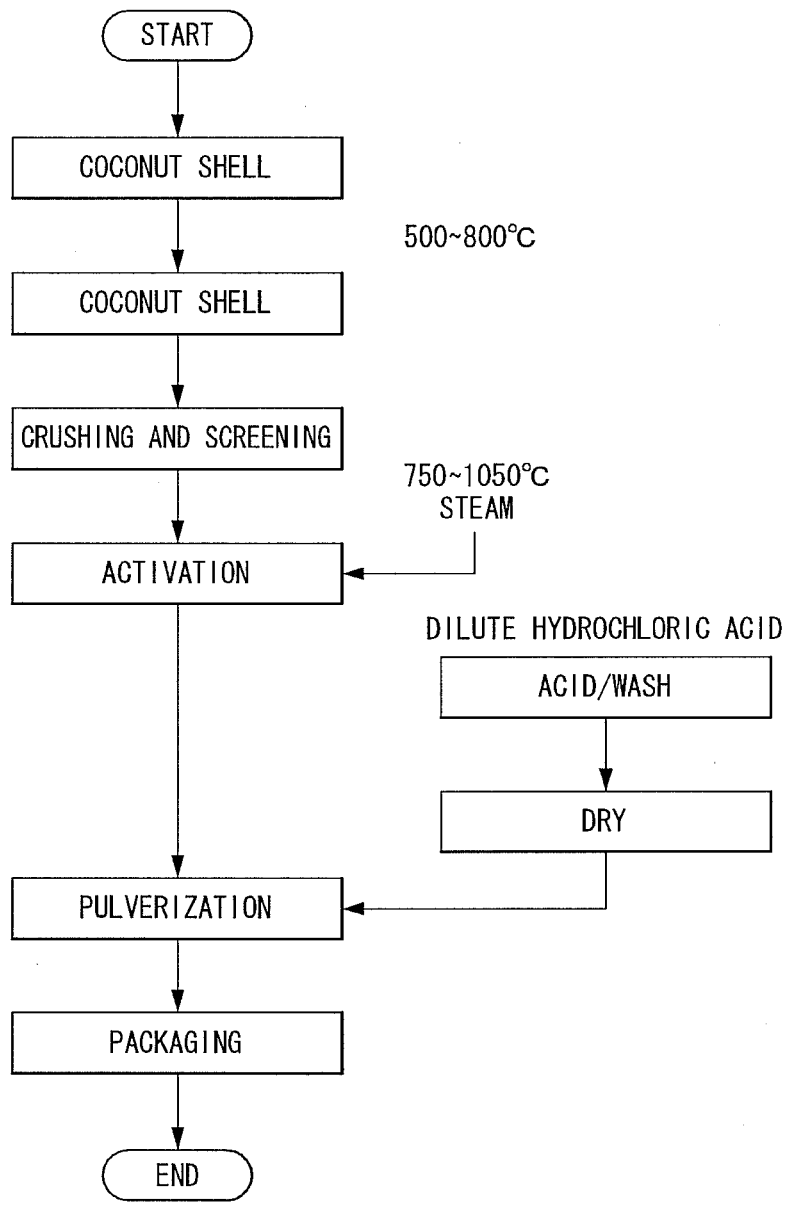
FIGS. 3 and 4 are flowcharts illustrating manufacturing granular activated carbon according to an embodiment of the present invention.

FIG. 3 illustrates a method of manufacturing granular activated carbon using coconut shell as a raw material.

Referring to FIG. 3, coconut shell, a raw material, is prepared.

The coconut shell is subjected to dry carbonization at a temperature of 500 to 800° C., followed by crushing and screening.

Thereafter, the resultant material undergoes activation and pulverization, and is then packaged, thereby completing the coconut shell granular activated carbon.

Figure 4:
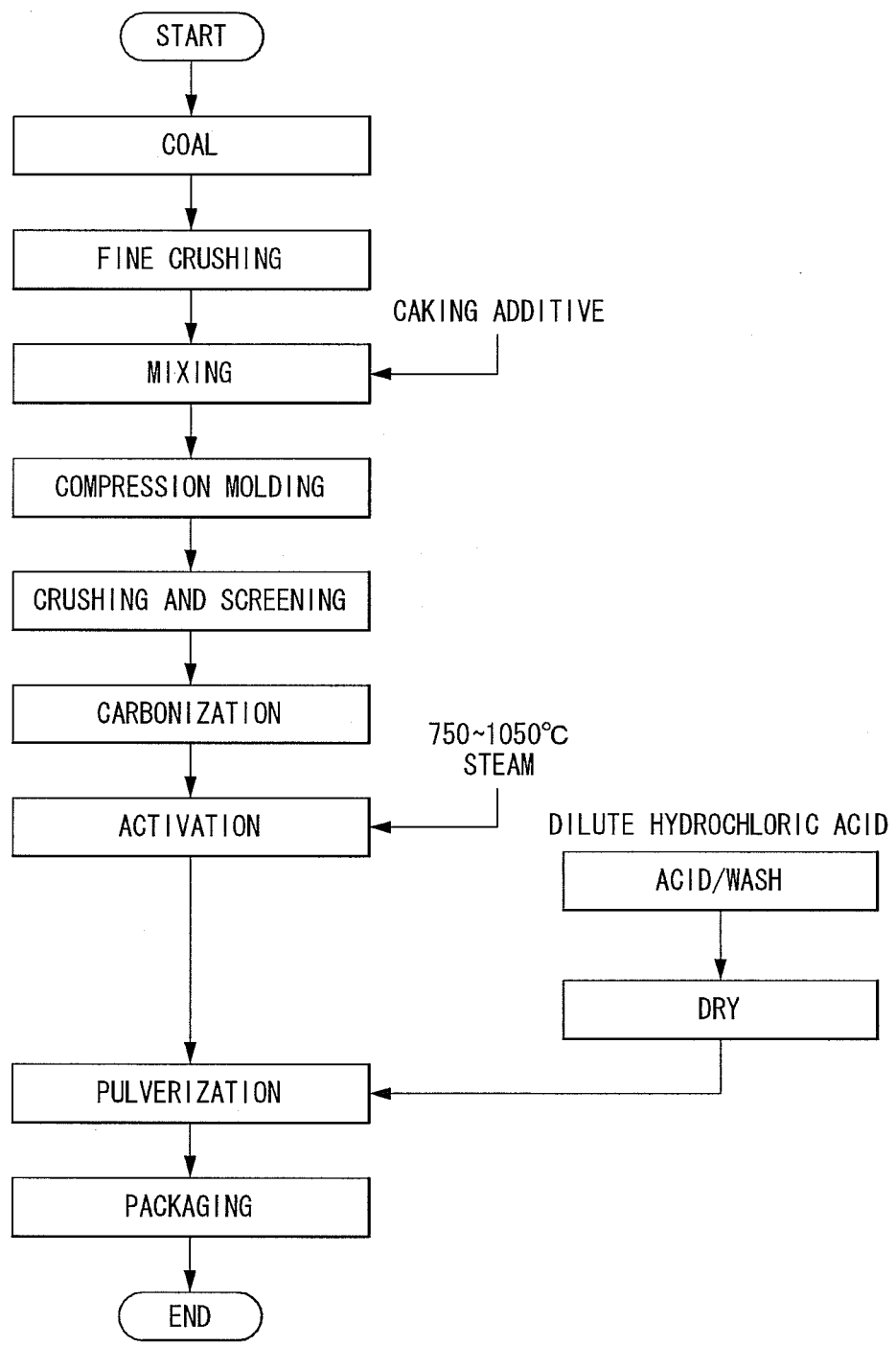

FIG. 4 illustrates a method of manufacturing granular activated carbon using coal as its raw material.

Referring to FIG. 4, coal is prepared as a raw material.

The coal is fine-crushed and mixed with a caking additive, and is then subjected to compression molding, crushing and screening, and carbonization. Thereafter, the resultant material goes through activation and pulverization and is then packaged, thus completing coal granular activated carbon.

The granular activated carbon has the following advantages.

The granular activated carbon is not scattered and is thus easy to treat, and a sharp change in the concentration of raw water does not affect outflow. Further, the granular activated carbon allows for continuous countercurrent operation, thus resulting in a lowering in operation costs. And, the granular activated carbon is recyclable, so that it is economical, and is combustible or recollected and processed to be harmless, so that it is eco-friendly. Since the granular activated carbon does not undergo particle coagulation, it results in a low chance of stoppage. The granular activated carbon may rid phenol, mercury, detergent, and other solvents included in the target water. Further, the granular activated carbon may enhance the taste, smell and turbidity of the target water by removing chlorine and may reduce parasites.

Figure 5:
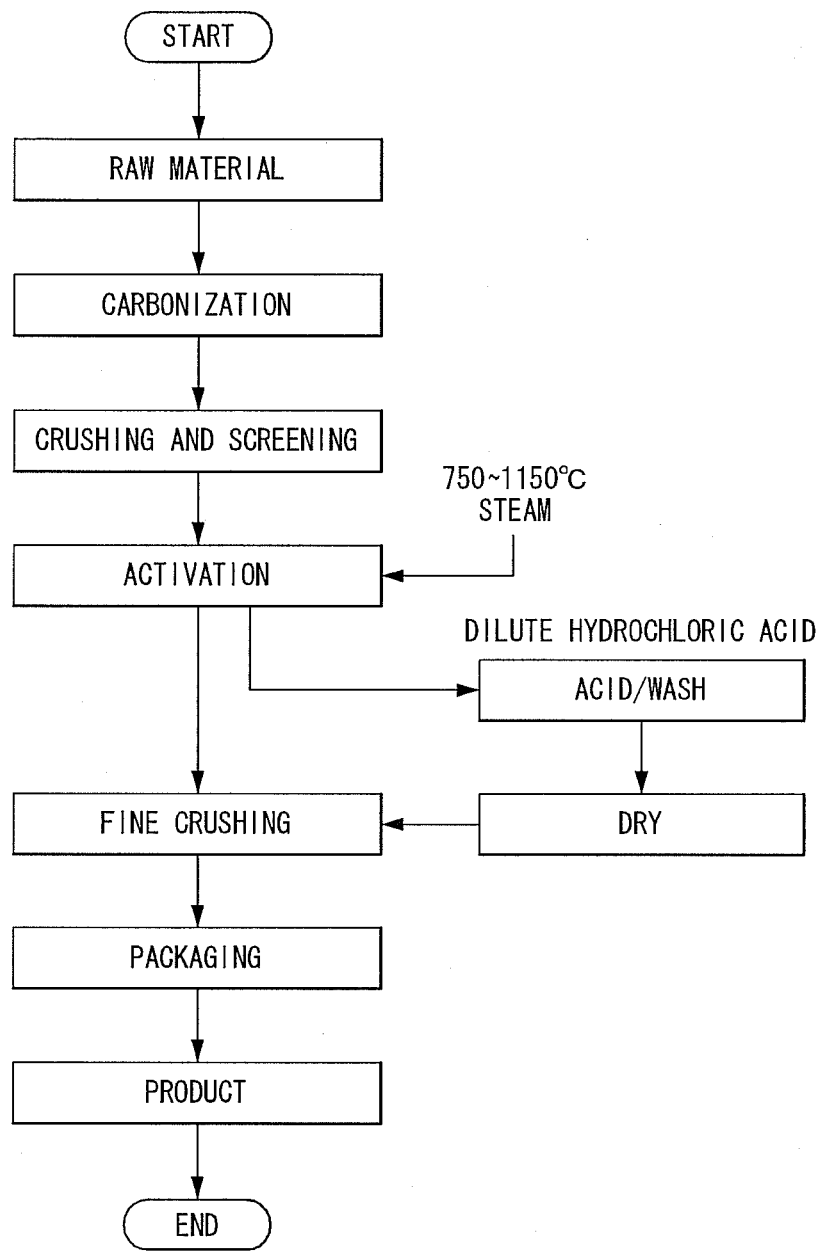
FIGS. 5 and 6 are flowcharts illustrating manufacturing powder-type activated carbon according to an embodiment of the present invention.

FIG. 5 illustrates a method of manufacturing powdered activated carbon.

Referring to FIG. 5, coconut shells or sawdust is used as a raw material.

When prepared, the raw material is sequentially subjected to carbonization, crushing and screening, activation, and fine crushing, thus completing powdered activated carbon.

Figure 6:
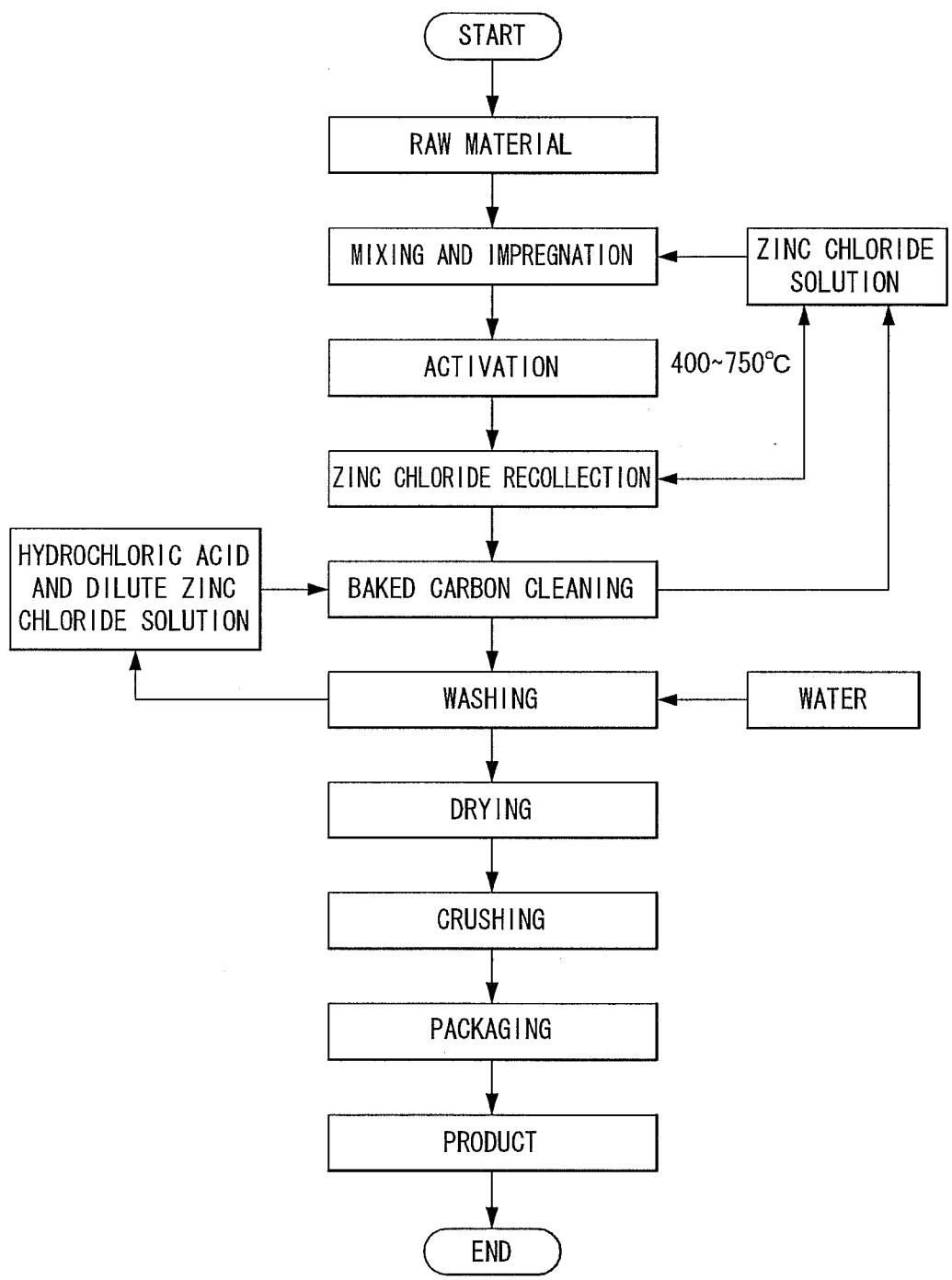

Further, FIG. 6 illustrates another method of manufacturing powder-type activated carbon.

Referring to FIG. 6, coconut shells and sawdust, which are raw materials, undergo mixing and impregnation, activation, zinc chloride recollection, baked carbon cleaning, washing, drying, crushing, and packaging, thereby completing powder-type activated carbon.

The powdered activated carbon may provide the following advantages.

The powdered activated carbon has a high adsorption speed and thus may be batch-processed to have high purity. The powdered activated carbon allows for use of a simple tank and low installation costs. When the powdered activated carbon is employed, a new one is used for each use, which reduces the likelihood of generation of microorganisms and a lowering in adsorption capacity.

The activated carbon employed for the activated carbon layer 30 and methods of manufacturing the same have been so far described. Hereinafter, the features of the activated carbon employed for the activated carbon layer 30 according to an embodiment of the present invention will be described.

The activated carbon layer 30 may include activated carbon having a variety of capabilities to be appropriate for purposes of water purification. That is, the activated carbon layer 30 may have a particle size of 38 to 200, an iodine number of 900 to 2000 mg/g, a pore volume of 0.3 to 0.8 cm$^3$/g, a pore size micro of 14 to 20 Å, and a pore size meso of 30 to 37 Å. The activated carbon layer 30 may include various types of activated carbon having the above attributes. For example, the activated carbon layer 30 may be constituted of at least one of first to fourth activated carbon to be described below.

For example, the first activated carbon may have an iodine number of 1400 mg/g or more, a particle size of 90 (48/100) meshes, a specific surface area (BET) of 1500 to 1700 m$^2$/g, a pore volume of 0.5 to 0.8 cm$^3$/g, a pore size micro of 15 to 16 Å, and a pore size meso of 30 to 35 Å.

The second activated carbon may have an iodine number of 950 mg/g or more, a particle size of 90 (60/150) meshes, a BET of 1000 to 1200 m$^2$/g, a pore volume of 0.3 to 0.5 cm$^3$/g, a pore size micro of 15 to 18 Å, and a pore size meso of 30 to 35 Å.

The third activated carbon may have an iodine number of 950 mg/g or more, a particle size of 90 (60/150) meshes, a BET of 1000 to 1200 m$^2$/g, a pore volume of 0.3 to 0.5 cm$^3$/g, a pore size micro of 15 to 18 Å, and a pore size meso of 30 to 35 Å.

The fourth activated carbon may have an iodine number of 1400 mg/g or more, a particle size of 95 (20/50) meshes, a BET of 1500 to 1700 m$^2$/g, a pore volume of 0.5 to 0.8 cm$^3$/g, a pore size micro of 15 to 16 Å, and a pore size meso of 30 to 35 Å.

The first to fourth activated carbon may be made in the form of granules or powder.

The iodine number may refer to a representative index of the specific surface area of the activated carbon.

The specific surface area may refer to a numeral value obtained by analyzing the pore size volume through nitrogen adsorption-desorption isotherms curves.

In the meantime, a large pore volume or pore size may provide an advantage of being able to adsorb substances having a relatively large molecular size.

Hereinafter, an adsorbent (media) that may be contained in the activated carbon layer 30 will be described.

The adsorbent may function to supplement capability of the activated carbon. In other words, the adsorbent may supplement the capacity of the activated carbon layer to thereby remove more harmful substances contained in the water and to thereby enhance capacity of removing heavy metals, disinfection byproducts, malodors and taste.

The adsorbent may include, e.g., kinetic degradation fluxion (hereinafter, "KDF"), ATS, ion exchange resin, or silver ions. It is apparent to those skilled in the art to use a plurality of adsorbents.

KDF may provide the antibacterial and heavy metal removing effects. KDF, a compound of copper and zinc, may turn various harmful substances into harmless ones by exchanging electrons between chlorine and heave metals in the water and may generate magnetic fields to get rid of microorganisms. Further, hydroxyl radicals and peroxides generated from the water molecules kill viruses as well.

ATS, which is zeolite-based, may provide the effect of being able to remove heavy metals, such as lead. ATS may rid soluble lead that is generated due to a deterioration of water pipes and lead that remains in the water.

The ion exchange resin may provide the effect of being able to remove, particularly, heavy metals.

The adsorbent may be selectively combined with the above-described first to fourth activated carbon. That is, the adsorbent may be added in the last step of the method of manufacturing activated carbon described in connection with FIGS. 3 and 4. For example, after crushing and before packaging, the adsorbent may be added to produce an adsorbent-added activated carbon filter. Accordingly, no separate adsorbent layer is needed, thus resulting in a water purifier having a reduced size and enhanced water-purifying performance.

Turning back to FIG. 1, the activated carbon filtering unit 70 may include one or more activated carbon filtering units 70a and 70b. In other words, the activated carbon filtering unit 70 may include one or more activated carbon layers 30. Each of the one or more activated carbon layers 30 may selectively include various types of activated carbon, for example, the above-described first to fourth activated carbon, to enhance water-purifying performance. Hereinafter, various combinations of several types of activated carbon included in each activated carbon layer 30 will be described.

Hereinafter, for convenience of description, the activated carbon layer 30 included in the upper activated carbon filtering unit 70a is referred to as an upper activated carbon layer 30, and the activated carbon layer 30 included in the lower activated carbon filtering unit 70b is referred to as a lower activated carbon layer 30.

The upper activated carbon layer 30 and the lower activated carbon layer 30 may respectively include different types of activated carbon.

The upper activated carbon layer 30 may include an activated carbon filter that may secure a sufficient spatial flow rate of raw water. The lower activated carbon layer 30 may include an activated carbon filter and an adsorbent that may provide functions such as an increase in quality of purified water, protection of the membrane, and adsorption and removable of organic compounds.

For example, the upper activated carbon layer 30 may include the above-described first activated carbon, and the lower activated carbon layer 30 may include the second activated carbon.

As another example, the upper activated carbon layer 30 may include the above-described fourth activated carbon, and the lower activated carbon layer 30 may include the second activated carbon filter.

Meanwhile, the upper activated carbon layer 30 and the lower activated carbon layer 30 may include the same type of activated carbon. For example, the upper activated carbon layer 30 and the lower activated carbon layer 30 may include the above-described second activated carbon.

As described above, a combination of the upper activated carbon layer and the lower activated carbon layer may provide high purification speed as well as excellent water-purifying performance.

In the meantime, as shown in FIG. 1, the activated carbon layer 30 includes a plurality of activated carbon layers and is thus able to enhance the filter lifespan. The filter lifespan may refer to flow capacity at which, after having passed through a filter of a type other than RO filters, the concentration of chloroform-contained water may be reduced from 250 ppb to 50 ppb (80%), and may have the same meaning as the effective purification water amount.

An experiment shows that when a plurality of activated carbon layers are provided, the flow capacity may be increased by 50% compared with when a single activated carbon layer is provided.

The upper activated carbon layer 30 and the lower activated carbon layer 30 each may selectively have an adsorbent. For example, the upper activated carbon layer may include activated carbon only, and the lower activated carbon layer 30 may include activated carbon and an adsorbent. In such case, the lower activated carbon layer 30 may provide such functions as adsorption and removal of organic compounds that are not removed by the upper activated carbon layer 30 and enhancement of antibacterial function at a reasonable expense. That is, since a plurality of activated carbon layers 30 are provided, which include activated carbon and an adsorbent customized for each of the layers, water-purifying performance is enhanced.

On the other hand, the complex filter 1 for water purification may include a distributing plate 40 between the upper activated carbon filtering unit 70a and the lower activated carbon filtering unit 70b.

The distributing plate 40 may provide a function of widely spreading water that is forced toward a certain area.

The raw water purified by the upper activated carbon filtering unit may pass through the distributing plate 40 to the activated carbon fiber 20 of the lower activated carbon filtering unit 70b. Since the activated carbon fiber 20 may also provide a function of spreading water, the distributing plate 40 may be an arbitrary component.

After passing through the distributing plate 40, the raw water may enter into the lower activated carbon filtering unit 70b.

The activated carbon fiber 20 of the lower activated carbon filtering unit 70b may provide the same functions as the activated carbon fiber 20 of the upper activated carbon filtering unit 70a. Further, the activated carbon fiber 20 may be the above-described felt-type activated carbon fabric 22 or block molding-type activated carbon fabric 24 and may provide the same functions as what has been described above.

The inside of the complex filter 1 may be defined by providing a plurality of activated carbon filtering units 70a and 70b, e.g., a plurality of activated carbon fabric 20 layers. That is, it may be possible to prevent layers constituting each complex filter in the complex filter 1 from being mixed or mingled. Accordingly, only a particular filtering section may be selectively exchanged.

After passing through the activated carbon fiber 20, water goes back through the activated carbon layer 30 and the activated carbon fiber 20, which enables the repetitive purifying process.

It is apparent to those skilled in the art how many layers the activated carbon fiber 20 and the activated carbon layer 30 are constituted of.

After passing through the lower activated carbon filtering unit 70b, water may be oriented toward the hollow fiber membrane 60.

Hereinafter, the hollow fiber membrane 60 will be described in detail.

The hollow fiber membrane 60 is filled with hollow fibers that are as thin as a thread and may adsorb and remove unwanted materials, such as pathogenic microorganisms.

In general, the hollow fiber membrane 60 is a thread-like membrane having a cavity at its center and may selectively filter substances through its walls. The hollow fiber membrane 60 has a relatively large surface area with respect to the same volume compared with other types of membranes and thus has broad applications, such as water purification, disposal of wastewater, hemodialysis, or other industrial purposes.

More specifically, the hollow fiber membrane 60 may have fibers with micro pores, which is bundled with a few thousands of hollow fiber threads each having a diameter of, e.g., 0.01 to 0.1 micrometers. The hollow fiber membrane 60 may filter unwanted substances. For example, the hollow fiber membrane 60 may get rid of heavy metals, rust, or molds included in the target water. Further, the hollow fiber membrane 60 may remove protozoans, such as *cryptosporidium* or *giardia*. That is, since particles having a larger size than the pores formed at the hollow fiber membrane cannot pass through the pores of the hollow fiber membrane, harmful particles included in the target water may be effectively removed.

In such case, the water-purifying performance of the hollow fiber membrane 60 may be reduced by the pathogenic microorganisms that inhabit at the surface or inside the hollow fiber membrane. According to the present invention, the hollow fiber membrane 60 with antibacterial functions is used as a filter, so that the pathogenic microorganisms may be removed. Hereinafter, a method of manufacturing an antibacterial hollow fiber membrane will be described.

Figure 7:
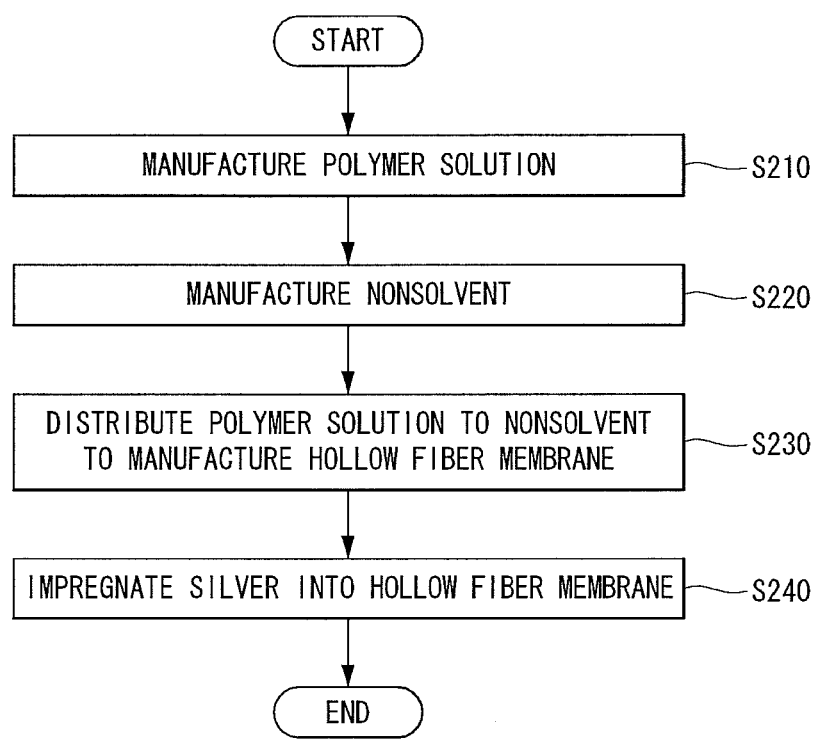
FIG. 7 is a flowchart for describing a method of manufacturing a hollow fabric membrane according to an embodiment of the present invention.

FIG. 7 is a flowchart illustrating a method of manufacturing a hollow fiber membrane according to an embodiment of the present invention.

<Produce Polymer Solution>

A polymer solution is produced (S210). The polymer solution contains polymer to form a hollow fiber membrane. The polymer solution may have the same meaning as a distributing solution.

To produce the polymer solution, at least one of polysulfone, polyethersulfone, polyvinylidene fluoride, polyacrylonitrile, cellulose acetate, cellulosetriacetate, polyurethane, polyetherimide may be used as polymer.

The polymer is dissolved in a solvent (hereinafter, referred to as "polymer solvent"), thereby forming a polymer solution.

The polymer solvent may be at least one of N-methylpyrrolidone, dimethylacetamide, and dimethylformamide. The polymer may be produced to have 10 to 30 weight % with respect of the polymer solvent.

<Produce Nonsolvent>

A nonsolvent is produced (S220). The nonsolvent hardens the polymer included in the polymer solvent, thereby forming the hollow fiber membrane.

The nonsolvent may be at least one of N-methylpyrrolidone, dimethylacetamide, and dimethylformamide. Each of N-methylpyrrolidone, dimethylacetamide, and dimethylformamide may have 5 to 20 weight % with respect to water.

<Spread Polymer Solution to Nonsolvent>

The polymer solution is spread to the nonsolvent, thereby forming a hollow fiber membrane (S230).

The hollow fiber membrane may include pores and bores. The pores may be distributed between an active layer which is an outer skin of the hollow fiber membrane and a support layer which is an inner skin of the hollow fiber membrane. The bores may refer to paths for water purification, which are provided inside the support layer.

As an agent for forming the pores in the hollow fiber membrane, polyvinylpyrrolidone having 0 to 20 weight % with respect to water may be used.

As the nonsolvent on the side of bores, at least one of water, N-methylpyrrolidone, dimethylacetamide, dimethylformamide, sodium chloride aqueous solution, calcium chloride aqueous solution, and calcium carbonate aqueous solution may be used. Each of N-methylpyrrolidone, dimethylacetamide, dimethylformamide may have 5 to 20 weight % with respect to water. Sodium chloride aqueous solution may have 10 or less weight % with respect to water, calcium chloride aqueous solution may have 12 or less weight % with respect to water, and calcium carbonate aqueous solution may have 20 or less weight % with respect to water.

The temperature of the polymer solution may be at least one of 20 to 30° C., 60 to 80° C., or 100 to 150° C. When the temperature of the polymer solution is 20 to 30° C., the polymer may be hardened by a nonsolvent induced phase separating method, and when the temperature of the polymer solution is 60 to 80° C. or 100 to 150° C., the polymer may be hardened by a thermally induced phase separating method as well as the nonsolvent induced phase separating method.

The temperature of the nonsolvent may be at least one of 5 to 30° C. or 60 to 100° C. As the temperature of the nonsolvent decreases, the spread polymer solvent slowly comes out, and as the temperature of the nonsolvent increases, the polymer solvent swiftly comes out, so that it may affect the pore size or mechanical strength of the hollow fiber membrane. For example, when the temperature of the nonsolvent decreases, the number of pores may increase. In such case, an increased number of pores may allow for even impregnation of silver ions which will be described below.

In summary, if the polymer solution of a predetermined temperature is spread to the nonsolvent of a predetermined temperature, the polymer solvent is exited out of the polymer solution so that the polymer may be hardened. At this time, pores and bores may be formed in the hollow fiber membrane by influence from the pore forming agent and solvent at the side of the bores.

The shape, penetration ratio, pore size, and mechanical strength of a hollow fiber membrane to be formed may be adjusted by changing the composition, concentration, and temperature of the polymer solution and the nonsolvent. For example, polyvinylidene fluoride, as the polymer, and dimethylacetamide, as the polymer solvent, are selected with the temperature of the polymer solution selected as one of 100 to 120° C. As the nonsolvent, water is selected, and its temperature is in the range of 70 to 80° C. As the nonsolvent at the side of the bores, 10 weight % of dimethylacetamide is selected, whose temperature is in the range of 18 to 20° C. Thusly formed hollow fiber membrane may be porous. That is, innumerable tiny pores may be provided between the active layer and the support layer. In such case, silver may be evenly distributed between the pores, and the amount of silver to be impregnated may be increased.

<Impregnate Silver into Hollow Fiber Membrane>

Continuous processes may be conducted on the formed hollow fiber membrane to thereby impregnate silver (S240).

To increase the amount of impregnated silver, the surface of the hollow fiber membrane may be modified. For example, the surface of the hollow fiber membrane may be treated by hydrochloric acid aqueous solution or sulfuric acid aqueous solution of 5 to 20 weight %. That is, surface modification of the hollow fiber membrane may enable silver ions to be evenly and swiftly impregnated into the hollow fiber membrane.

The surface-modified hollow fiber membrane may be soaked into a silver ion solution tank, thereby creating a reaction.

The silver ion solution may include at least one of silver nitrate ($AgNO_3$, ammonia solution, ethylenediaminetetraacetic acid (hereinafter, "EDTA"), and a buffer solution.

Silver nitrate may generate silver ions when dissolved. EDTA may prevent the solution from coagulating. The buffer solution refers to a solution that may constantly maintain pH by the common ion effect even when an acid or base is added.

Further, the silver ion solution may contain a stabilizer to allow for even impregnation of silver ions. The stabilizer may be at least one of polyvinyl alcohol, alginate, or chitosan having 0.08 to 5 weight %.

The hollow fiber membrane may be soaked into the silver ion solution tank, so that a silver ion precursor may be impregnated into the surface and pores of the hollow fabric membrane.

The silver ion precursor-impregnated hollow fiber membrane may be soaked in a reaction tank for reduction.

The reaction tank may include a reducing agent of the silver ion precursor. The reducing agent may oxidize the silver ion precursor to thereby form silver on the hollow fiber membrane.

For example, the reducing agent may be 0.05M to 2M hydrazine aqueous solution or anhydrous hydrazine aqueous solution.

Since the hydrazine aqueous solution or anhydrous hydrazine aqueous solution is included by 0.05M to 2M, the formed silver particles may have a size enough to be able to be formed between the active layer and support layer of the hollow fiber membrane. Accordingly, the formed silver particles may be evenly distributed over the surface and pores of the hollow fiber membrane. Meanwhile, if the hydrazine aqueous solution or anhydrous hydrazine aqueous solution is included by 0.05M or less, a small amount of silver is generated, and if it is included by 2M or more, it may have no or little influence on the size of the formed silver particles compared with the amount of the added reducing agent.

Further, since hydrazine or anhydrous hydrazine hydrate has a high speed of oxidizing the silver ion precursor, productivity may be increased.

In the meantime, an ultrasonic device may apply for silver ions to be well adsorbed onto the hollow fiber membrane. That is, ultrasonic vibrations may allow silver ions to easily infiltrate into the pores and bores of the hollow fiber membrane.

Further, steps S210 to S240 may be implemented as a serious continuous process, thereby increasing the productivity of the antibacterial hollow fiber membrane.

Figure 8:
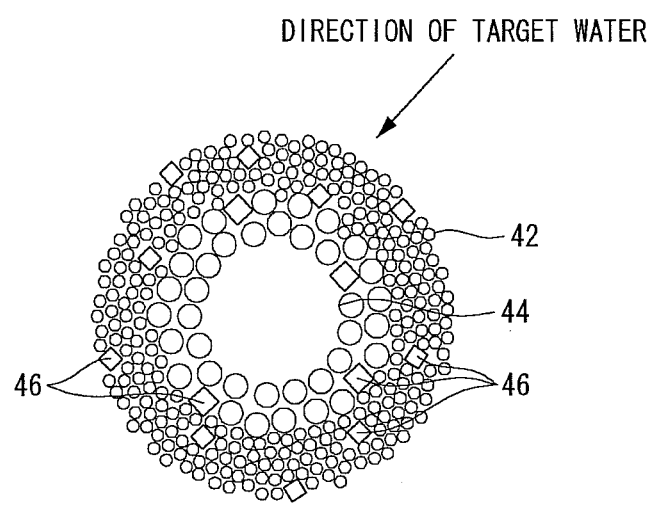
FIG. 8 illustrates a cross section of an antibacterial hollow fiber membrane manufactured according to an embodiment of the present invention.

FIG. 8 illustrates a cross section of an antibacterial hollow fiber membrane produced according to an embodiment of the present invention.

The hollow fiber membrane may include an active layer 42, a support layer 44, bores and silver particles 46.

The active layer 42, which is an outer skin of the hollow fibers, may have densely formed pores. The support layer 44, which is an inner skin of the hollow fibers, may have larger pores. As described above, the size of the pores may vary depending on reaction conditions, such as the type of polymer solution, concentration of nonsolvent, or temperature.

A bore may refer to a water path formed inside the support layer. For example, target water may flow into the bore via the active layer 42 and the support layer 44. Harmful substances included in the target water may be removed while passing through the active layer 42 and the support layer 44 having the pores. That is, harmful substances which are larger in size that the pores may be filtered by the hollow fiber membrane. The filtered target water may be discharged to the outlet 14 via the bore.

Further, the silver particles 46 may be formed on the surface of the active layer 42 and at the pores between the active layer 42 and the support layer 44. The silver particles may prevent pathogenic microorganisms and/or viruses from proliferating. For example, the silver particles 46 may prevent proliferation of the pathogenic microorganisms and/or viruses filtered by the pores between the active layer 42 and the support layer 44. That is, according to the antibacterial hollow fiber membrane produced by the manufacturing method of the present invention, the hollow fiber membrane may remain clean, so that the water-purifying performance of the hollow fiber membrane may be enhanced and the lifespan of the hollow fiber membrane may be increased.

After passing through the hollow fiber membrane 60, water is discharged out of the complex filter 1 via the outlet 14.

It is apparent that the above-described 1 may be installed in a water purifier.

Further, the complex filter 1 according to an embodiment and illustrated in FIG. 1 is arranged so that target water naturally flows downward by gravity. That is, the target water in the complex filter 1 may flow in a direction. In such case, the activated carbon fiber 20, the activated carbon layer 30, and the hollow fiber membrane 60 included in the complex filter 1 are arranged to be perpendicular to the direction of the target water and has a stacked structure that allows the target water to be alternately filtered by the layers. That is, the activated carbon fiber 20 and the activated carbon layer 30 are arranged along a side surface of the complex filter 1. Such arrangement allows the filters to be selectively exchanged without exchanging all the filters since the uppermost filter reaches the filter exchange time earliest when the filters are selectively exchanged, thereby resulting in a saving of expense.

Figure 9:
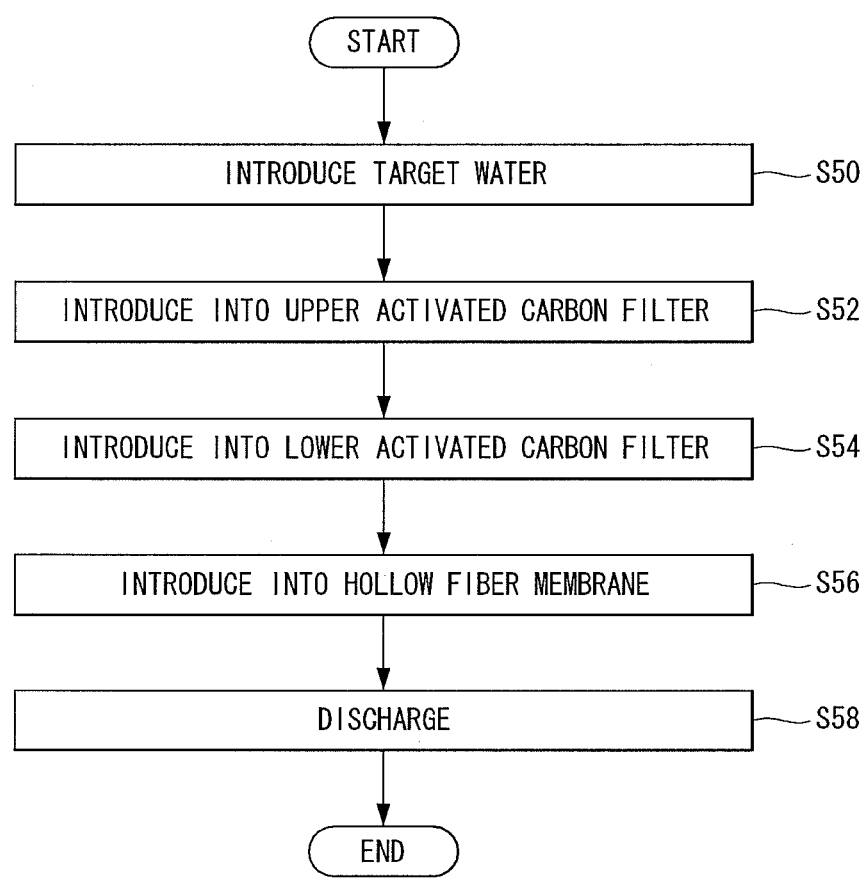
FIG. 9 illustrates an order of water purification according to an embodiment of the present invention.

Hereinafter, an order of water purification according to an embodiment of the present invention will be described with reference to FIG. 9. The embodiment in connection with FIG. 9 is described based on the configuration of the complex filter 1 shown in FIG. 1. It is assumed that the upper activated carbon filtering unit 70a according to the embodiment illustrated in FIG. 1 includes first activated carbon, and the lower activated carbon filtering unit 70b includes second activated carbon and KDF, ATS, silver ions, and an ion exchange resin adsorbent. This is merely an embodiment, and it is apparent that the upper activated carbon filtering unit 70a and the lower activated carbon filtering unit 70b may include the above-described other types of activated carbon and adsorbents.

Target water may be introduced via the inlet 12 (S50).

The target water reaches the upper activated carbon filtering unit via the inlet 12 (S52).

The upper activated carbon filtering unit primarily removes organic compounds included in the introduced target water. In particular, the first activated carbon filter may minimize flow rate resistance so that the flow rate of water may be maintained.

After passing through the upper activated carbon filtering unit 70a reaches the lower activated carbon filtering unit 70b via the upper activated carbon filtering unit 70a (S54).

The lower activated carbon filtering unit 70b may secondarily rid organic compounds contained in the target water. Further, the lower activated carbon filtering unit may provide additional functions, such as antibacterial functions or removal of harmful heavy metals.

The functions of the purifying filters included in the upper activated carbon filtering unit 70a and the lower activated carbon filtering unit 70b, such as the activated carbon fiber 20 and the activated carbon layer 30, will be described below with reference to FIG. 13.

After passing through the lower activated carbon filtering unit 70b, the target water may reach the hollow fiber membrane 16 (S56).

The hollow fabric membrane 16 may remove bacterial substances, such as bacteria or microorganisms contained in the target water.

After passing through the hollow fiber membrane 16, the target water may be discharged out via the outlet 14 (S58).

Figure 10:
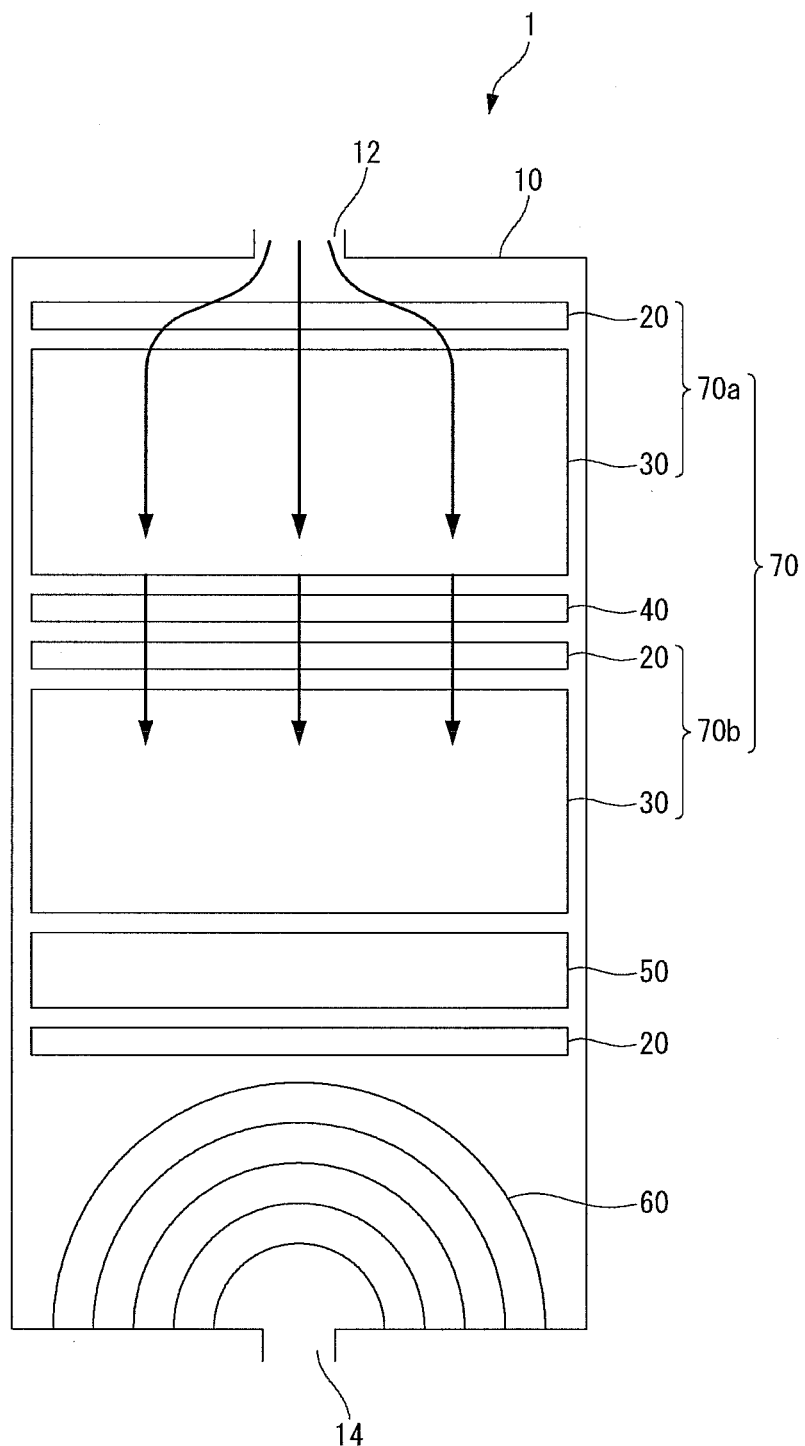
FIG. 10 illustrates a complex filter for water purification according to another embodiment of the present invention.
Figure 11:
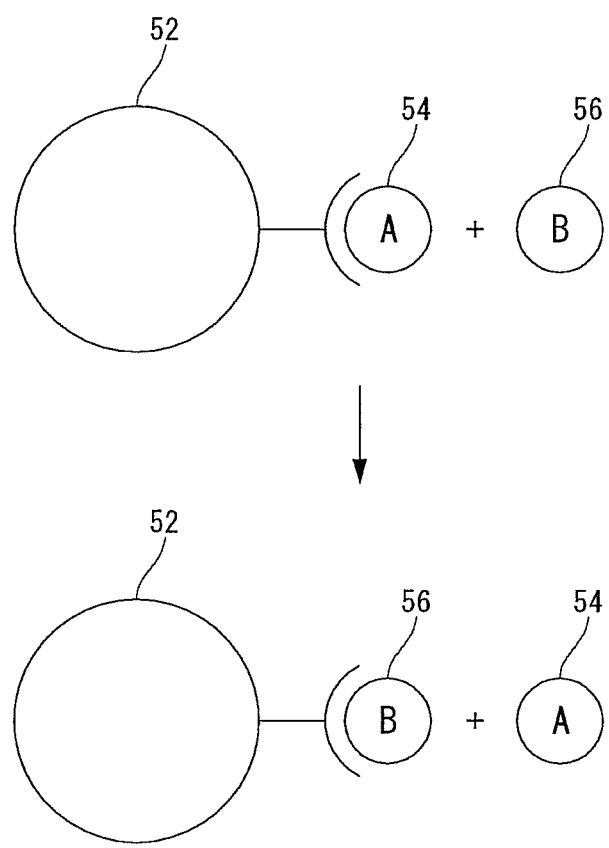
FIGS. 11 and 12 are view for describing an ion exchange reaction according to an embodiment of the present invention.
Figure 12:
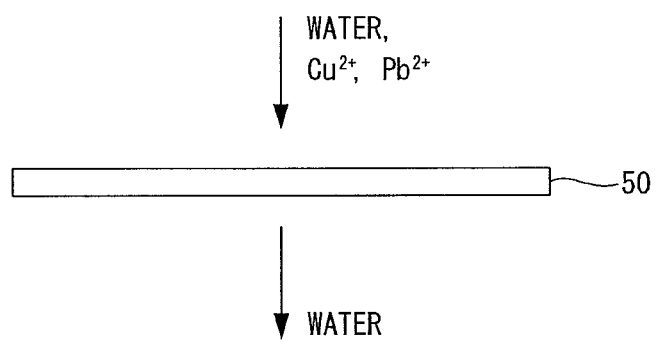

FIG. 10 illustrates a complex filter for water purification according to another embodiment of the present invention, and FIGS. 11 and 12 are views for describing an ion exchange reaction according to an embodiment of the present invention.

The complex filter for water purification according to another embodiment of the present invention has an ion exchange unit, so that the complex filter may provide a function of purifying water using an ion exchange principle.

Unlike the complex filter described in connection with FIG. 1, the complex filter 1 illustrated in FIG. 10 further includes an ion exchange unit 50. The activated carbon filtering unit 70 illustrated in FIG. 1, together with the ion exchange unit 50, may be referred to as a complex filter module.

The ion exchange unit 50 may include ion exchange fibers, ion exchange resin, and activated carbon fibers having an ion exchange function. The ion exchange unit 50 may include an ion exchange layer.

Referring to FIG. 11, the ion exchange reaction is described in detail.

A functional group 54 such as a cation or an anion is bonded to a backbone 52.

The backbone 52 may provide a frame for the functional group 54. If the functional group 54 reacts with a reaction substance 56, the reaction substance 56 may be bonded to the backbone 52. The reaction substance 56 refers to a harmful substance contained in the water.

For example, if the reaction substance 56 having a cation approaches a functional group of a cation, the reaction substance 56 is bonded with the backbone 52, so that the reaction substance 56 may be removed. Accordingly, the harmful heavy metals may be removed from the target water. For example, Pb2+ and Cu2+ may be left out.

Referring to FIG. 12, as water, Cu2+, and Pb2+ pass through the ion exchange unit 50, Cu2+ and Pb2+ are removed, with only water passed.

As described above, the ion exchange fibers that may perform an ion exchange reaction will be described hereinafter.

<Ion Exchange Fiber>

Ion exchange fiber refers to the one obtained by forming an ion exchange resin having ions with the same sign as the heavy metal ions contained in the target water to a membrane and by molding it in the form of fiber. The polymer matrix in the ion exchange fiber may have high tensile strength and may be shaped so that high-concentration functional groups are transplanted in the polymer matrix. The polymer matrix may have high ion exchange capacity, high capacity of adsorbing unwanted materials, high strength, intensity, elasticity, and flexibility. The polymer matrix, which is a type of fiber, exhibits excellent processability.

The cation exchange fiber having cations as its functional group may be an acid, and the anion exchange fiber having anions as its functional group may be a base.

<Method of Manufacturing Ion Exchange Fibers>

Ion exchange fibers may be manufactured by the following method.

Ion exchange fibers may employ as their base material polyvinyl alcohol (PVA). Styrene is polymerized with the base material. Styrene polymerization may modify the base material by irradiating radiation, ultraviolet rays, or plasma to the base material.

Thereafter, a functional group is generated. A functional group that may exchange cations or anions through sulfuric acid or other chemical treatments may be generated. For example, the ion exchange fibers may be separated into cation exchange fibers, anion exchange fibers, and chelate resin according to the characteristics of the functional group of the ion exchanging unit.

The cation exchange fibers are in the form of a combination of a polymer backbone and a cation functional group.

The cation functional group may be a sulfonate groupe ($SO_3H$) or a carboxyl group (COOH).

In the case that the cation functional group is a sulfonate group ($SO_3H$), H+ ions in $SO_3H$ may be exchanged with cations contained in the water. For the nature, H+ ions may be exchanged with strong acidic cations that correspond to an inorganic acid.

When the cation functional group is a carboxyl group (COOH), H+ ions in COOH may be exchanged with cations in the water. For the nature, H+ ions may be exchanged with weak acidic cations that correspond to an organic acid.

The anion exchange fiber is in the form of a combination of a polymer backbone and an anion functional group.

The anion functional group may be an oxime group (NOH) or an amino group ($NH_2$).

When the anion functional group is an oxime group (NOH), OH-ions of NOH may be exchanged with anions of the water. From the nature, the OH-ions may be exchanged with strong basic anions that correspond to basicity.

When the anion functional group is an amino group ($NH_2$), $NH_2$ may react with water, thus forming OH-ions. The OH-ions may be exchanged with anions of the water. For the nature, the OH-ions may be exchanged with weak basic anions that correspond to basicity.

The chelate resin is ion exchange fiber having a functional group of a ligand, which may form a chelate.

Chelate is a complex compound in which two or more ligands form coordinate bonds with a central metal atom to thereby create a ring shape. The ligands refer to molecules or ions that form a bond around the central metal ion forming the coordinate bond. A ligand should have an unpaired electron pair.

For example, the chelate resin may be in the form of a combination of a polymer backbone and $CH_2N(CH_2COOH)_2$. H+ ions in COOH may be exchanged with heavy metal ions. According to the type of the functional group, the heavy metals may be selectively removed.

The ion exchange unit 50 may include a single layer as shown in FIG. 10, or although not shown, may have a stacked structure with a plurality of layers. If the ion exchange unit 50 includes a plurality of layers, it may be positioned between the activated carbon fiber 20 and the activated carbon layer 30 or between the activated carbon filtering units 70a and 70b.

Further, the ion exchange fiber may be manufactured in the form of a sheet. In the case that the ion exchange unit 50 is in the form of an ion exchange fiber sheet, it may not require a separate partitioning part to partition a layer from another when stacked. Further, since it is not in the form of being mixed with the activated carbon layer 30, it is easy to separate the granular activated carbon from the ion exchange fiber when the filter is recollected and recycled.

Still further, the sheet-type ion exchange fiber may be easily stacked onto the housing 10, so that the complex filter 1 may have a simplified structure and be made smaller.

Figure 13:
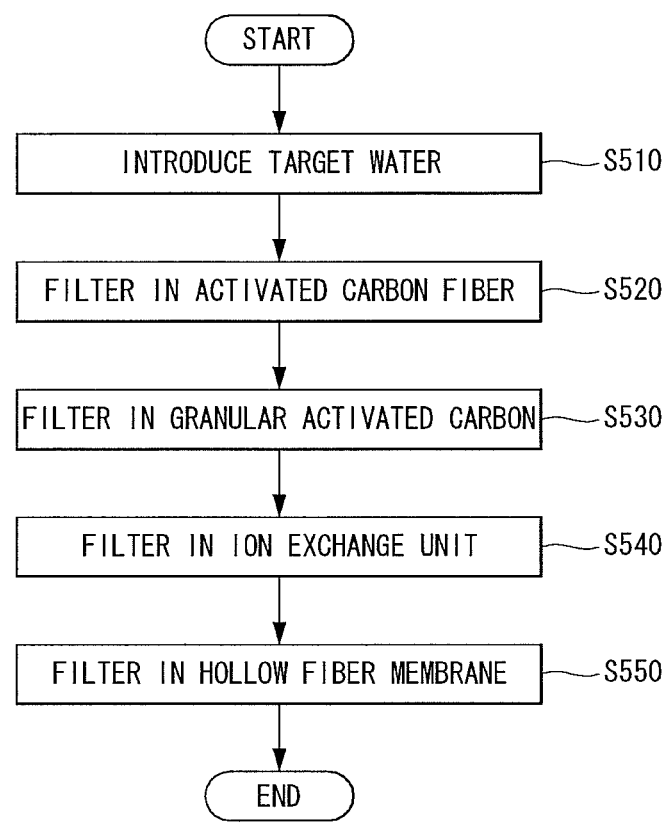
FIG. 13 is a view for describing a method of operating a complex filter according to the present invention.

FIG. 13 is a view for describing a method of operating a complex filter according to the present invention. FIG. 13 is based on the structure illustrated in FIG. 10 according to an embodiment of the present invention. The operating method illustrated in FIG. 13 may also apply to the embodiment described in connection with FIG. 1.

The target water may be introduced into the complex filter 1 via the inlet 12 (S510).

The introduced target water passes through the activated carbon fiber 20 (S520).

The activated carbon fiber 20 may adsorb and remove organic materials contained in the target water.

Further, the activated carbon fiber 20 may function as a distributing plate that spreads the target water.

After passing through the activated carbon fiber 20, the target water goes through the activated carbon layer 30 (S530).

The activated carbon layer 30 may make better the taste of the target water and may adsorb and remove organic materials.

After passing through the activated carbon layer 30, the target water goes through the ion exchange unit 50 (S540).

The ion exchange unit 50 may rid harmful heavy metals included in the target water. Thereafter, as described above, filtering may be performed while the target water repeatedly passes through the activated carbon fiber 20, the activated carbon layer 30, and the ion exchange unit 50. That is, the target water may pass through one or more activated carbon filtering units 70, for example, the upper activated carbon filtering unit 70a and the lower activated carbon filtering unit 70b, and the ion exchange unit 50, and may be thereby purified.

After passing through the ion exchange unit 50, the target water goes through the hollow fiber membrane 60 (S550).

The target water introduced into the hollow fiber membrane 60, in particular, the antibacterial hollow fiber membrane 60, may remove harmful substances, e.g., pathogenic microorganisms, contained in the target water through pores formed through a surface of the hollow fiber membrane 60. Further, the silver particles impregnated in the hollow fiber membrane may suppress proliferation of microorganisms and/or viruses filtered by the pores of the hollow fiber membrane.

The target water purified by the hollow fiber membrane 60 may be purified and then discharged through the outlet 14.

Various combinations of the complex filter for water purification according to an embodiment of the present invention described in connection with FIGS. 1 to 13 may provide a complex filter for a water purifier and a water purifier that may exhibit the optimal capacity.

It is apparent to those skilled in the art that the present invention is not limited to the above-described embodiments and may be modified in various ways without departing from the spirit and scope of the invention. It should be understood that all the modifications or variations are also within the scope of the appended claims.

INDUSTRIAL APPLICABILITY

According to the present invention, there is provided a complex filter for a water purifier including one or more activated carbon layers having an antibacterial hollow fiber membrane, activated carbon fiber, and ion exchange fiber which are combined with one another in an optimal manner and a water purifier including the same, so that the water purifier may provide a reduced size and enhanced capacity and increased lifespan.

The invention claimed is:

1. A complex filter for water purification, comprising: a housing; an inlet formed at an upper side of the housing, wherein water to be purified is introduced through the inlet; an outlet formed at a lower side of the housing, wherein the water to be purified is purified and then discharged through the outlet; a first activated carbon layer and a second activated carbon layer located between the inlet and the outlet, wherein the first activated carbon layer is a distance apart from the second activated carbon layer; first second and third activated carbon fiber layers configured to prevent granular activated carbons of the first activated carbon layer and the second activated carbon layer from being mixed with other layers, wherein the first activated carbon fiber layer is disposed at an upper side of the first activated carbon layer, the second activated carbon fiber layer is disposed between the first activated carbon layer and the second activated carbon layer, and the third activated carbon fiber layer is disposed below the second activated carbon layer; and a hollow fiber membrane-disposed between the third activated carbon fiber layer and the outlet.

2. The complex filter of claim 1, wherein the granular activated carbons have a particle size of 48 to 200 meshes, an iodine number of 900 to 2000 mg/g, a pore volume of 0.3 to 0.8 $cm^3/g$, a pore size micro of 14 to 20 Å, and a pore size meso of 30 to 37 Å.

3. The complex filter of claim 1, wherein each of the activated carbon fiber layers has a block molding or a plurality of felt patterns.

4. The complex filter of claim 1, comprising an ion exchange layer having a polymer and a functional group bonded with the polymer, and the ion exchange layer is disposed between the second activated carbon layer and the outlet, wherein the functional group includes a cation functional group, an anion functional group, and a chelate functional group.

5. The complex filter of claim 4, wherein the cation functional group includes at least one of a sulfonate group ($SO_3H$) and a carboxyl group (COOH).

6. The complex filter of claim 4, wherein the anion functional group includes at least one of an oxime group (NOH) and an amino group ($NH_2$).

7. The complex filter of claim 1, comprising at least one of KDF (Kinetic Degradation Fluxion), ATS, and silver ions.

* * * * *